Jan. 8, 1935.   D. L. WOOD   1,987,041
CAMERA VIEW FINDER
Filed July 30, 1932
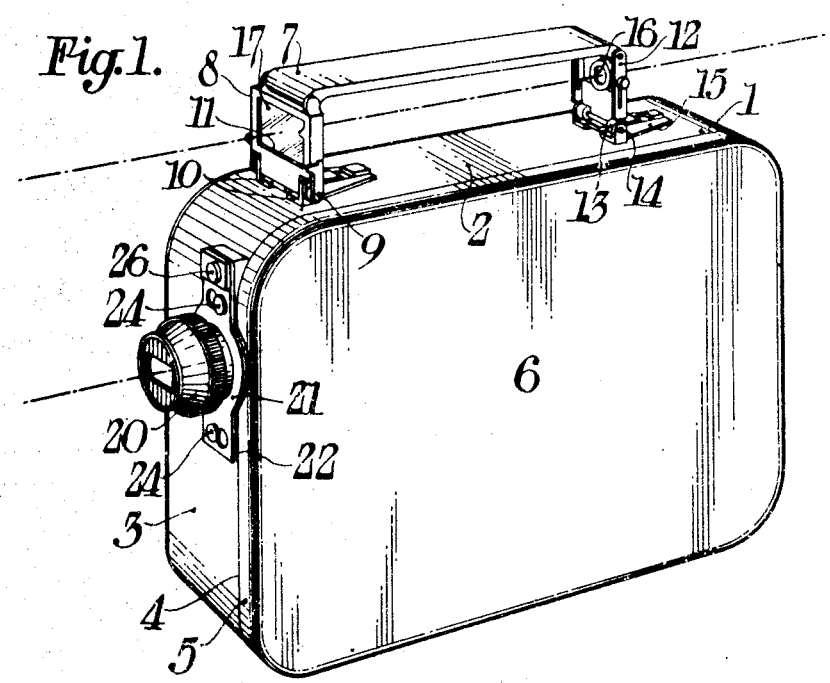
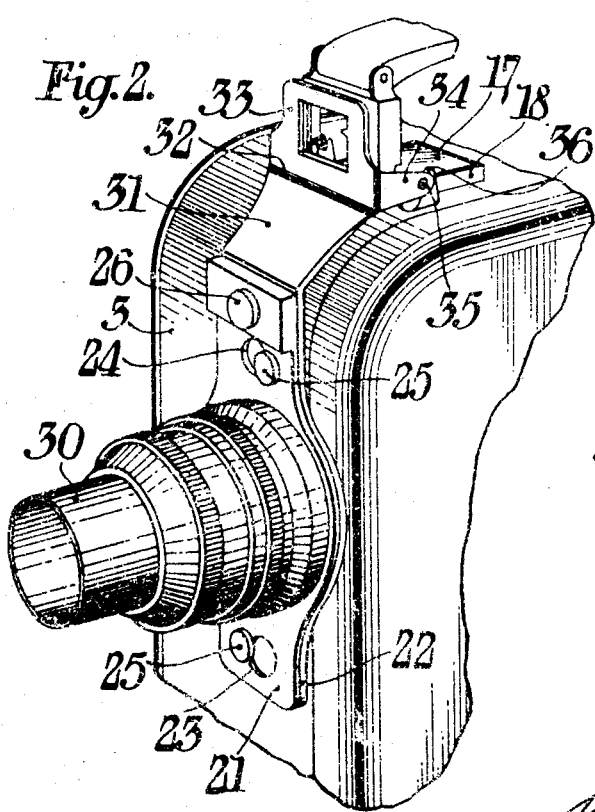
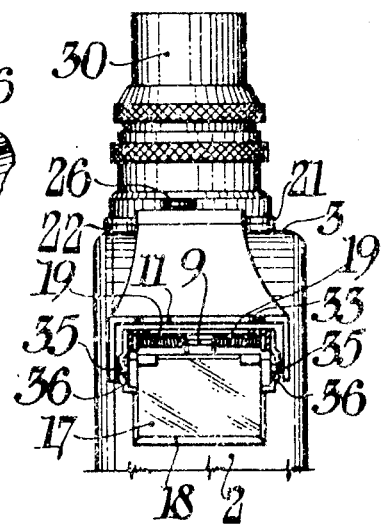
Donald L. Wood, Inventor Patented Jan. 8, 1935

1,987,041

UNITED STATES PATENT OFFICE 1,987,041

CAMERA VIEW FINDER

Donald L. Wood, Rochester, N. Y., assignor to Eastman Kodak Company, Rochester, N. Y., a corporation of New York Application July 30, 1932, Serial No. 626,887

4 Claims. (Cl. 88—1.5)

This invention relates to photography and more particularly to view finders for photographic cameras. One object of my invention is to provide a view finder especially adapted for registering the proper field of views when objectives of different focal lengths are employed. Another object of my invention is to provide a view finder in which the field of view will be adjusted by sliding an objective of different focal length into place. Still another object of my invention is to provide a simple connection between an element of a view finder and an objective whereby the objective may automatically position the finder element. Still another object of my invention is to provide a finder element which will return to a normal operative position when the standard objective is returned to an operative position, and other objects will appear from the following specification, the novel features being particularly pointed out in the claims at the end thereof.

Coming now to the drawing wherein like reference characters denote like parts throughout:

Fig. 1 is a perspective view of a camera having a finder constructed in accordance with and embodying a preferred form of my invention.

Fig. 2 is an enlarged fragmentary view showing a finder element shown in Fig. 1 moved from an operative position by means of a supplemental objective.

Fig. 3 is an enlarged fragmentary top plan view of the finder element positioned as shown in Fig. 2.

In photographic cameras whether designed for taking still or motion pictures, it is frequently necessary or desirable to use objectives of different focal lengths. Ordinarily, the finders which normally come with such cameras do not accurately register the field of view for more than one objective.

In motion picture cameras, objectives of long focal length are frequently required and the present finder has been particularly designed to properly register the field of view irrespective of the type or focal length of the objective being used.

As one embodiment of my invention I have illustrated a camera as being of a simple type primarily designed for amateur use. The camera may comprise a body portion 1 which includes a top wall 2 and a front wall 3, there being an edge 4 extending around these two walls and the walls opposite to them to form a rabbet in which an edge 5 of a cover 6 may fit as is customary with cameras of this type.

There may be a handle 7 of the usual type and this handle may be supported upon a front link 8 hingedly attached to a pintle 9 supported by the bracket 10 carried on the top wall 2 of the camera. The link 8 is preferably provided with a masking frame 11 to define a field of view.

The opposite end of the handle 7 may be supported by a bracket 12 hingedly attached at 13 to a pintle 14 supported by the bracket 15. Member 12 is preferably provided with a peep-hole 16. If desired, this may have a magnifying lens to assist in viewing the image in the collective lens 17 which may be supported in a frame 18 also mounted on the hinged pintle 9 as best shown in Fig. 3. Springs 19 encircling the pintle 9 tend to move the lens 17 into an operative position or one in which it lies behind the masking member 11.

The camera may be provided with an objective mounted in a tubular support 20, this support being carried by a plate 21. Plate 21, as best shown in Fig. 2, lies over a second plate 22 and there are pairs of registering apertures 23 and 24 adapted to slide on pins 25 carried by the front wall 3 so that the objective may be locked in place by the locking handle 26. The details of the locking construction and the slidable support for the objective may be had by referring to U. S. Patent #1,736,436, Carl Fuerst, dated November 19, 1929, wherein the structure is fully described.

For the purpose of my present invention the particular locking mechanism is not of importance, it being only necessary that the objective be mounted to slide to and from the camera in moving to an operative position on the camera wall.

When the camera is used with its normal objective 20, as illustrated in Fig. 1, the finder element 17 is in an erect operative position in which it will properly define the field of view of the objective. However, when the objective in mount 20 is removed by releasing the latching member 26 and turning the plates 21 and 22 so that the pins 25 may be released it is necessary to adjust the finder for the objective which will then be utilized.

Accordingly, an objective mounted in a housing 30, as indicated in Fig. 2, may be employed. This objective is placed in the camera by sliding the plates 21 and 22 over the fixed pins 25. This action moves the lens axially along the studs 25 and in so doing the upper end of plate 22 moves the finder element 17 to an inoperative position.

In order to accomplish this, the following mechanism is employed. Extending upwardly from plate 22 there is an offset bracket 31, this bracket being again bent upwardly at 32 to form a frame 33, which will properly define the field of view of the objective. From each side of the frame 33 there extends rearwardly an arm 34, each arm carrying a pin 35. These two pins 35, as best shown in Fig. 3, engage the cams 36 carried by the frame 18 which normally supports the collective lens 17.

As the objective is moved onto the camera, the pins 35 strike these cams and move the finder element 17 into the position shown in Fig. 3, which is an inoperative position and which is against the pressure of the springs 19.

The finder then consists of the frame 33 and the rear peep-sight 16. The frame 33 is made of a size which will properly define the field of view for the objective mounted in the barrel 30.

Obviously, any number of objectives could be provided, each one being mounted on a mount similar to that above described, the only difference being that the frame 33 would be altered to suit the focal length of the particular objective employed.

One advantage of the structure which has been described is that when the objective mounted in the barrel 30 is removed, the finder element 17 is immediately restored by means of action of the springs 19 to its original operative position, as shown in Fig. 1. Consequently, if the lens mount 20 is then placed on the camera the finder is in the proper condition for use.

If, however, still another objective in a suitable mount is placed on the camera, the finder element 17 may be again rocked downwardly from its operative position in order to permit the particular frame 33 to function which is necessary for the objective being used.

While I have described a preferred embodiment of my invention it is obvious that various embodiments may be made without departing from the spirit of my invention. Consequently I contemplate as within the scope of my invention all such modifications as may come within the scope of the appended claims.

Having thus described my invention what I claim as new and desire to be secured by Letters Patent of the United States is:

1. In a camera adapted to be used with objectives of different focal lengths, the combination with a base plate, an objective carried by said base plate, of means on the camera for removably supporting said plate, a finder carried by said camera and including two spaced finder elements at least one of which is hingedly attached to said camera, a spring adapted to hold said hinged finder element in an operative position whereby the finder elements may define the field of view for objectives of a normal focal length, means carried by a base plate for a lens of a different focal length from normal adapted to engage and move said hinged finder element from its operative position when said second mentioned base plate is supported on said camera.

2. In a camera adapted to be used with objectives of different focal lengths, the combination with a base plate, an objective carried by said base plate, of means on the camera for removably supporting said plate, a finder carried by said camera and including two spaced finder elements at least one of which is hingedly attached to said camera, a spring adapted to hold said hinged finder element in an operative position whereby the finder elements may define the field of view for objectives of a normal focal length, means carried by a base plate for a lens of a different focal length from normal adapted to engage and move said hinged finder element from its operative position when said second mentioned base plate is supported on said camera and means for defining the field of view for the objective carried by the second mentioned base plate and adapted to cooperate with the other finder element on the camera.

3. In a camera adapted to be used with objectives of different focal lengths, the combination with a base plate, an objective carried by said base plate, of means on the camera for removably supporting said plate, a finder carried by said camera and including two spaced finder elements at least one of which is hingedly attached to said camera, a spring adapted to hold said hinged finder element in an operative position whereby the finder elements may define the field of view for objectives of a normal focal length, means carried by a base plate for a lens of a different focal length from normal adapted to engage and move said hinged finder element from its operative position when said second mentioned base plate is supported on said camera and means for defining the field of view for the objective carried by the second mentioned base plate adapted to cooperate with the other finder element on the camera, said means comprising a finder carried by the second mentioned base plate in a fixed position relative thereto.

4. In a camera adapted to be used with objectives of different focal lengths, the combination with a base plate, an objective on said base plate having an abnormal focal length, and a supplementary finder element carried by said base plate, of means on the camera for removably supporting a base plate, two spaced finder elements carried by said camera adapted to include between them a normal field of view, at least one of said finder elements being hingedly mounted, a spring for holding said hingedly mounted finder element in an operative position for defining the field of view of a normal focal length objective, said finder element being adapted to be moved to an inoperative position by said base plate for an abnormal focal length objective being mounted on said camera, whereby said supplementary finder element carried by said base plate may be operatively positioned to define the field of view covered by said abnormal focal length objective.

DONALD L. WOOD.